(12) United States Patent
Fang

(10) Patent No.: US 11,001,179 B1
(45) Date of Patent: May 11, 2021

(54) VEHICULAR BENCH SEAT COVER SYSTEM

(71) Applicant: Huyan Fang, Secaucus, NJ (US)

(72) Inventor: Huyan Fang, Secaucus, NJ (US)

( * ) Notice: Subject to any disclaimer, the term of this patent is extended or adjusted under 35 U.S.C. 154(b) by 0 days.

(21) Appl. No.: 16/721,158

(22) Filed: Dec. 19, 2019

(51) Int. Cl.
| | |
|---|---|
| *B60N 2/64* | (2006.01) |
| *B60N 2/20* | (2006.01) |
| *B60N 2/58* | (2006.01) |
| *B60N 2/01* | (2006.01) |
| *B60N 2/02* | (2006.01) |

(52) U.S. Cl.
CPC ............ *B60N 2/643* (2013.01); *B60N 2/01* (2013.01); *B60N 2/20* (2013.01); *B60N 2/5825* (2013.01); *B60N 2002/0288* (2013.01); *B60N 2205/35* (2013.01)

(58) Field of Classification Search
CPC . B60N 2/643; B60N 2/64; B60N 2/01; B60N 2/20; B60N 2/5825; B60N 2/58; B60N 2/5816; B60N 2/5833; B60N 2/585; B60N 2002/0288; B60N 2205/35
USPC .......................................................... 297/257
See application file for complete search history.

(56) References Cited

U.S. PATENT DOCUMENTS

| | | | |
|---|---|---|---|
| 9,669,742 B1 * | 6/2017 | Bailey | B60R 5/006 |
| 10,081,278 B1 * | 9/2018 | Balzer | B60N 2/60 |
| 2005/0236874 A1 * | 10/2005 | Godshaw | A01K 1/0272 |
| | | | 297/35 |

* cited by examiner

*Primary Examiner* — Mark R Wendell
(74) *Attorney, Agent, or Firm* — Dunlap Bennett & Ludwig, PLLC

(57) ABSTRACT

A vehicular seat bench cover system is provided. The vehicular seat bench cover system provides coverage of each section of the seat bench—the passenger-side, driver-side, center sections of both the back and seat portions—either circumscribed or enclosed in separate covers or covered by the separate cover sections being joined. Mindful that each section can independently move between an upright condition and a folded condition, the seat bench cover system provides a section cover for each section, wherein each separate cover provides a detachable fastener along one or both longitudinal edges so that adjacent section covers can be joined or be independently circumscribed by different permutations of the seat bench cover system depending on whether that section and an adjacent section are in the upright condition or folded condition relative to each other.

4 Claims, 4 Drawing Sheets

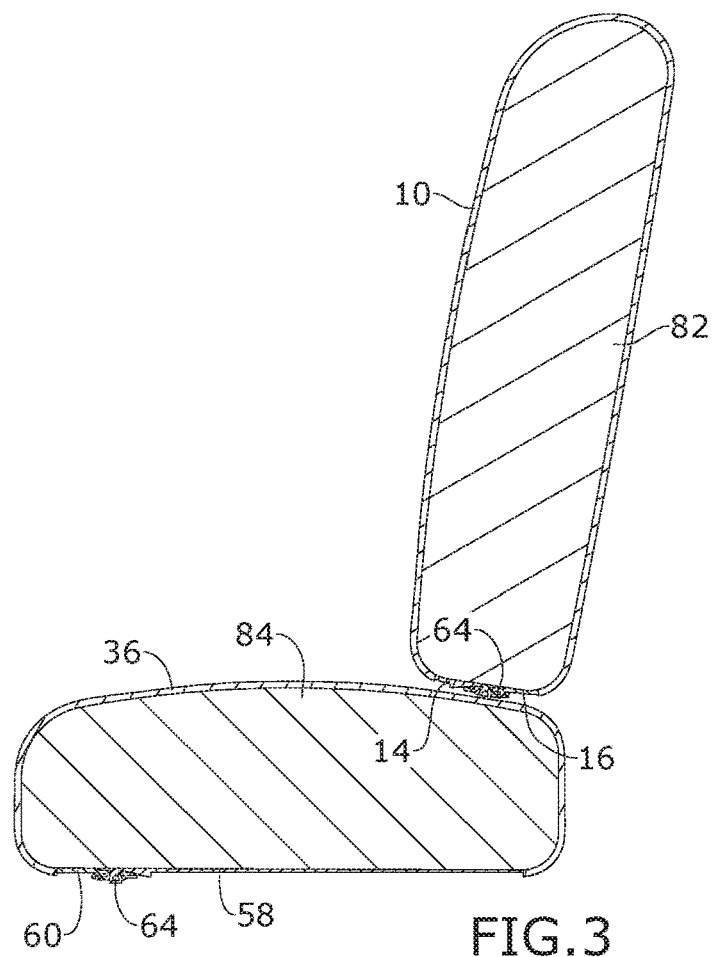
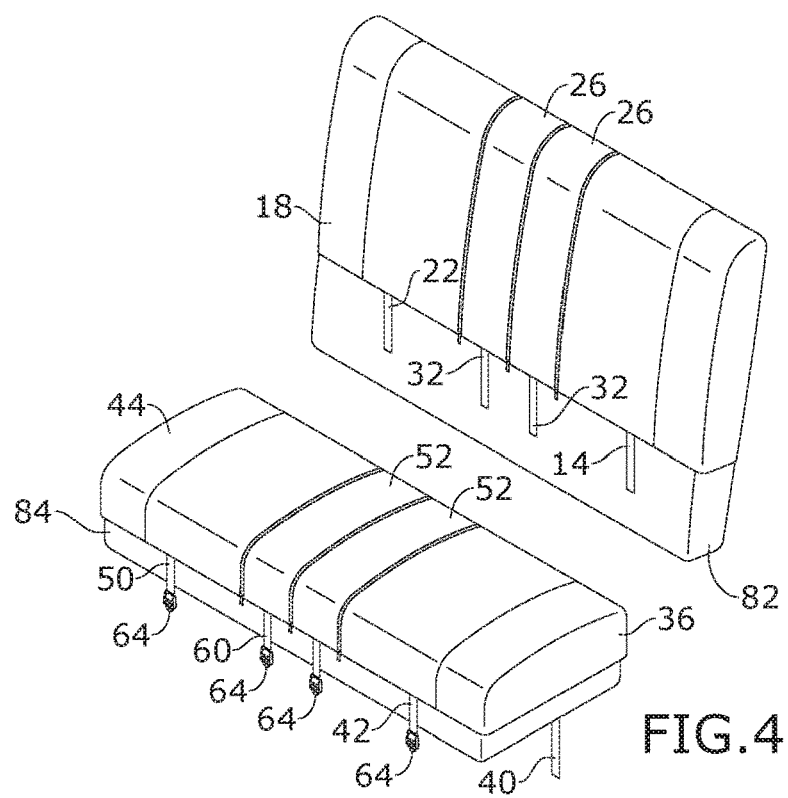

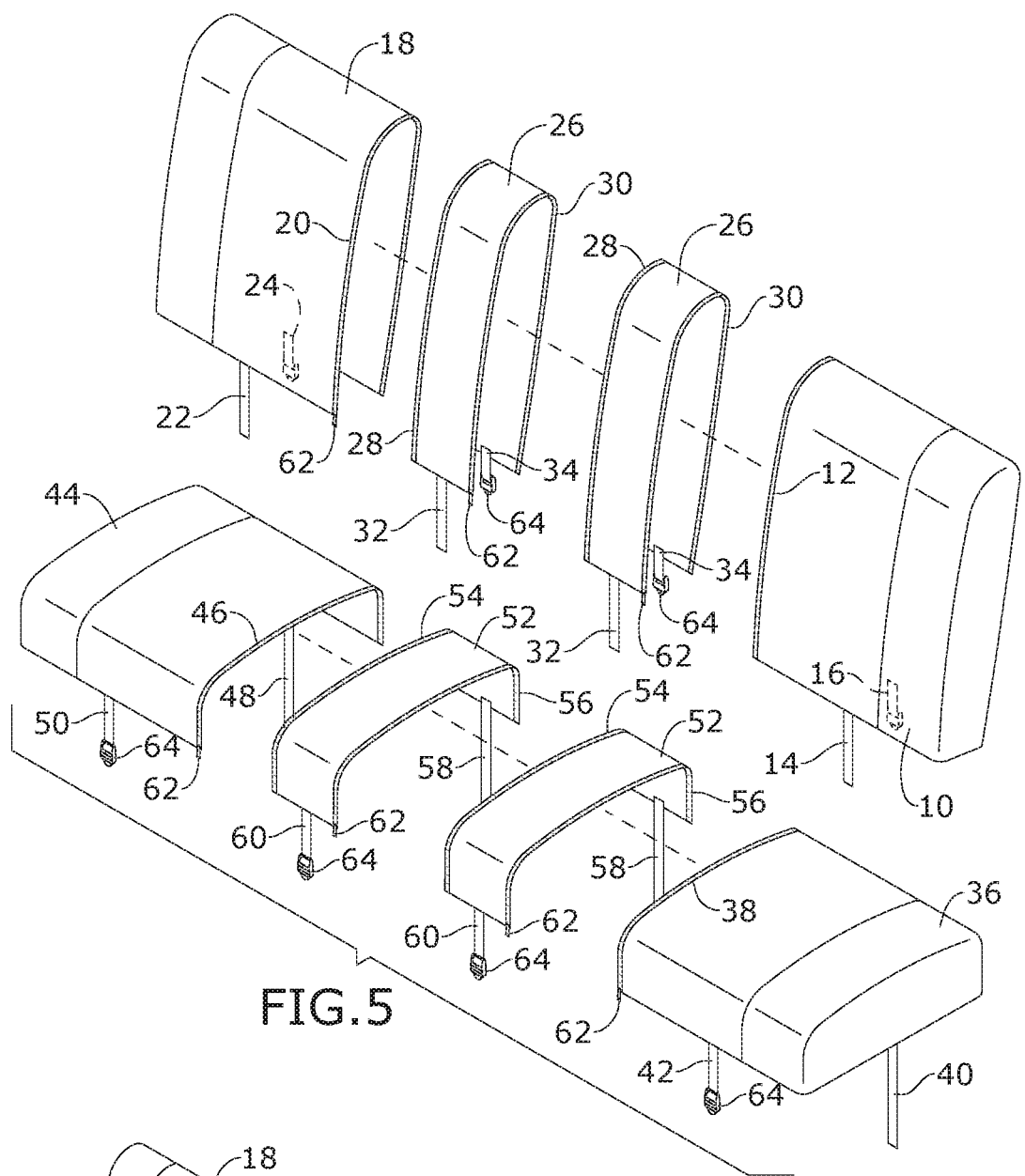
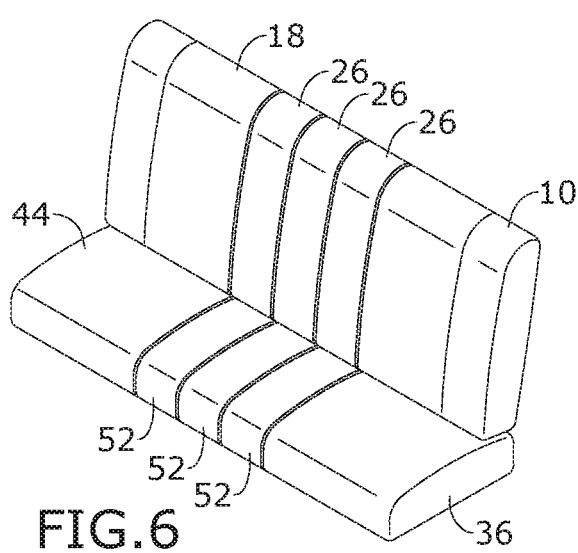
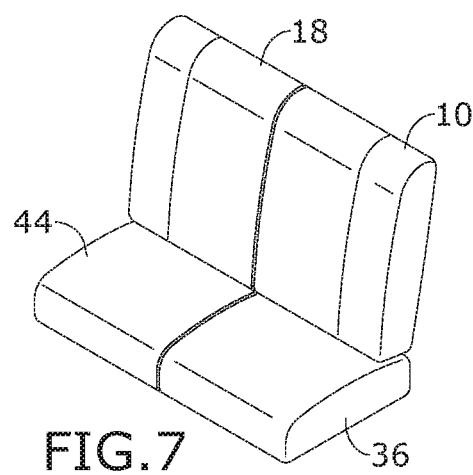

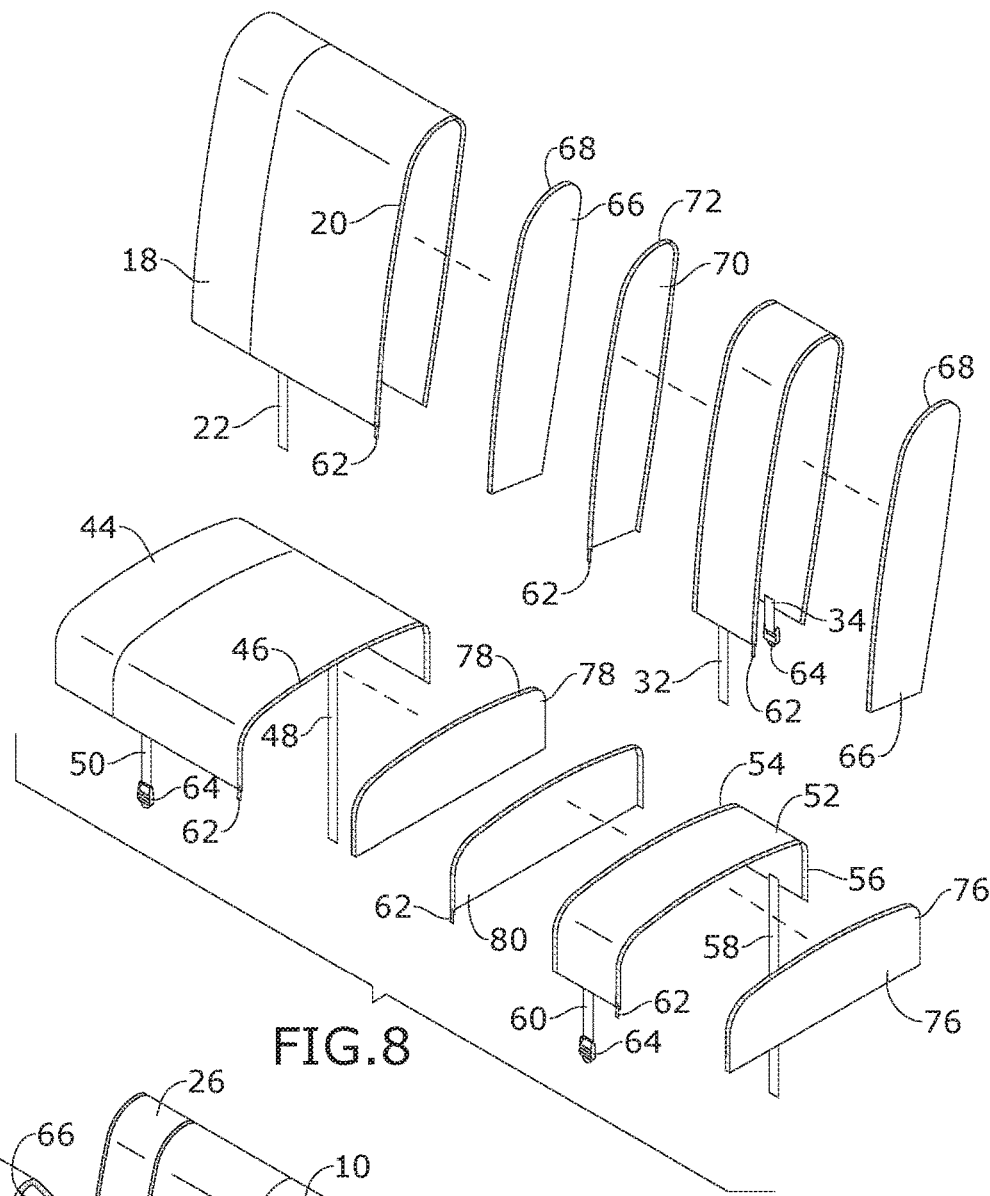
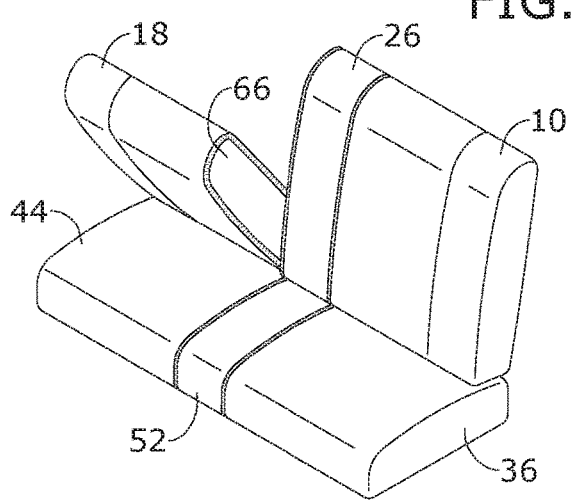

VEHICULAR BENCH SEAT COVER SYSTEM

BACKGROUND OF THE INVENTION

The present invention relates to car seat accessories and, more particularly, to a vehicular bench seat cover that covers front, side and back of a car bench seat, while being adapted to accommodate the split feature inherent in a vehicular bench seat, where different sections can be folded down or upright relative to the bench seat.

Most universal car bench seat covers in the market today do not cover the back of the bench seat, leaving the back exposed and unprotected. These solutions also utilize straps for securing the cover to the back of the seat; as a result, these approaches look unpleasant if there are people sitting behind the seat such as in a three row SUV. Moreover, most seat bench covers do not cover the side of the seat when adjacent sections are split, as extra side covers are not included. Furthermore, current seat bench covers use zippers to unzip the entire cover whenever the seat needs to be folded, which is inconvenient to do that every time one needs to fold down the seat and/or backrest.

In short, current bench covers do not work well because there are too much manual work having to unzip the cover every time to fold down one section of the seat bench. Aesthetically, the seat bench back will look unpleasant with securing straps of the bench seat cover exposed.

As can be seen, there is a need for a vehicular seat bench cover that covers front, side and back of a car bench seat, while being adapted to accommodate the split features of adjacent sections.

With the seat bench cover system embodied in the present invention, there will no longer be manual work or a need to unzip the entire cover every time one wants to move a section to a folded condition. Once installed properly, a user need only push down the seat whenever needed. The system also covers the entire bench on all sides even when the bench is in the folded condition. As a result, people sitting behind the seat bench will not see straps hanging and the back will be protected as well.

SUMMARY OF THE INVENTION

In one aspect of the present invention, a vehicular bench seat cover system includes the following: a vehicular bench seat having: a bench seat portion including: a driver-side seat section; and a passenger-side seat section, wherein each section seat section is movable between a folded condition and upright condition; a bench back portion; a driver-side back section; and a passenger-side back section, wherein each section back section is movable between a folded condition and an upright condition; a section cover for each seat section and each back section; a detachable fastener along an inner longitudinal edge or each section cover; an enclosure for each seat section and each back section; and a detachable fastener along both longitudinal edges of each enclosure, wherein each detachable fastener is selectively engageable with another detachable fastener so that each cover section can be joined to an adjacent cover section or one of the enclosures.

In another aspect of the present invention, the vehicular bench seat cover system of claim 1, further includes the following: one or more center seat section disposed between the driver-side seat section and the passenger-side seat section; and one or more center back section disposed between the driver-side back section and the passenger-side back section, wherein both longitudinal edges of the one or more center seat section and the one or more center back section has said detachable fastener, wherein each enclosure is made from mesh material.

These and other features, aspects and advantages of the present invention will become better understood with reference to the following drawings, description and claims.

BRIEF DESCRIPTION OF THE DRAWINGS

FIG. 3 is a section view of an exemplary embodiment of the present invention, taken along line 3-3 of FIG. 1;

FIG. 4 is a perspective view of an exemplary embodiment of the present invention;

FIG. 5 is an exploded view of an exemplary embodiment of the present invention;

FIG. 6 is a perspective view of an exemplary embodiment of the present invention, illustrating an elongated arrangement;

FIG. 7 is a perspective view of an exemplary embodiment of the present invention, illustrating a shortened arrangement;

FIG. 8 is an exploded perspective view of an exemplary embodiment of the present invention, illustrating attachment pieces 66, 70, 74 and 78; and FIG. 9 is a perspective view of an exemplary embodiment of the present invention, shown in use with one seat in a folded-forward condition, demonstrating the split feature.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a vehicular seat bench cover system wherein each section of the seat bench—the passenger-side, driver-side, center sections of both the back and seat portions—may be circumscribed or enclosed in separate covers or separate but joined cover sections. Mindful that each section can independently move between an upright condition and a folded condition, the seat bench cover system provides a section cover for each section, wherein each separate cover provides a detachable fastener along one or both longitudinal edges so that adjacent section covers can be joined or be independently circumscribed by different permutations of the seat bench cover system depending on whether that section and an adjacent section are in the upright condition or folded condition relative to each other.

Figure 1:
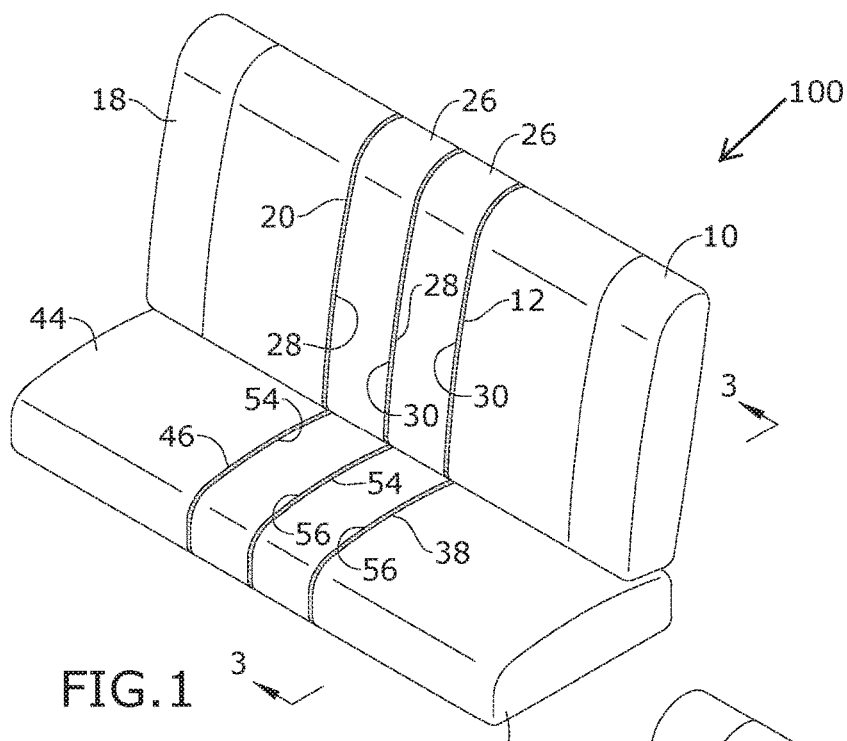
FIG. 1 is a perspective view of an exemplary embodiment of the present invention, shown in use.
Figure 2:
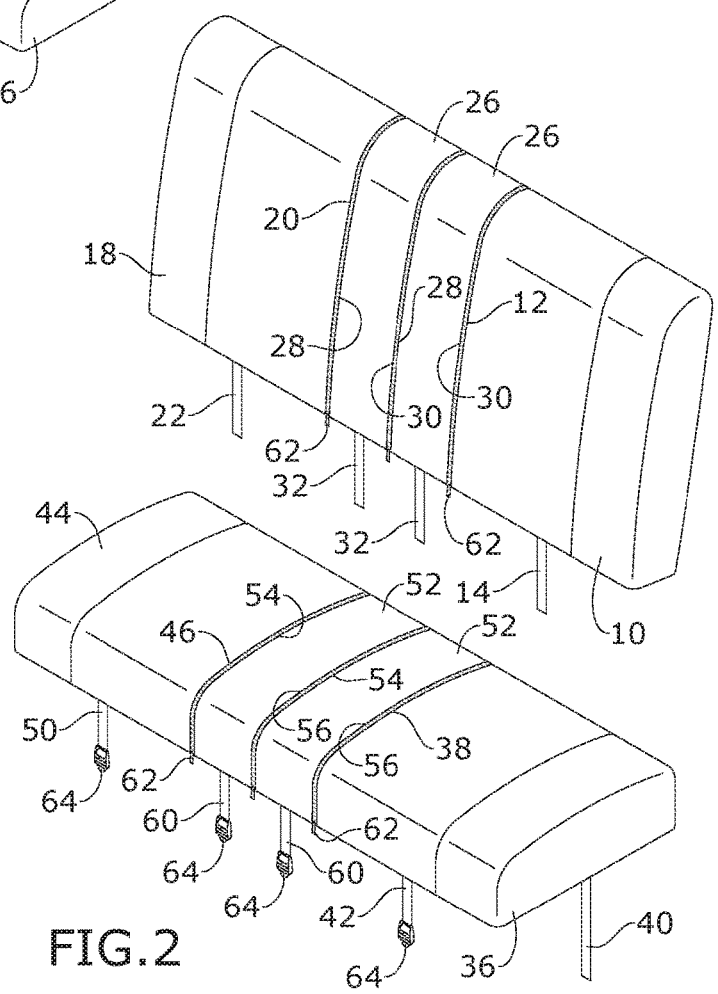
FIG. 2 is a perspective view of an exemplary embodiment of the present invention.

Referring to FIGS. 1 through 9, the present invention may include seat bench cover system 100 providing the following: a driver-side back cover 10, a driver-side back cover detachable fastener 12, a driver-side male connecting strap 14, a driver-side female connecting strap 16; passenger-side back cover 18, a passenger-side detachable fastener with pull 20, a passenger-side male connecting strap 22, a passenger-side female connecting strap 24, a center back cover 26, a center back detachable fastener 28, a center back detachable with pull 30, center male connecting strap 32, center female connecting strap 34, driver-side seat cover 36, a driver-side seat cover detachable 38, a driver-side male connecting strap 40, a driver-side female connecting strap 42, passenger-side seat cover 44, a passenger-side zipper with pull 46, passenger side male connecting strap 48, a passenger side female connecting strap 50, a center seat cover 52, a center seat detachable fastener 54, a center seat detachable fastener with pulls 56, center male connecting strap 58, center female connecting strap 60, detachable fastener pulls 62, first fasteners 64, first back side enclosure 66, a first back side cover detachable fastener 68, second back slide enclosure 70, second back side cover detachable with pull 72; a first seat side enclosure 74, a first seat side cover detachable fastener 76, a second seat side enclosure 78, a second seat side cover detachable fastener with pull 80; a bench back 82; and a bench seat 84.

It should be understood by those skilled in the art that the use of directional terms such as inward, outward, driver-side, passenger-side and the like are used in relation to the illustrative embodiments as they are depicted in the figures, the inward direction being toward the center of the bench back 82 or bench seat 84 of the corresponding figures.

The back seats (or "seat benches") of vehicles typically have a seat bench portion 84 and a bench back portion 82 that pivot relative to each other in whole and in part. Each seat and back portion includes two or more sections that can move relative to each other between an upright position and a folded condition. Typically, there is at least a passenger-side section and a driver-side section for both the seat and back portions. Also typical is one or more center sections between the passenger-side and the driver-side sections.

The present invention provides a seat bench cover system 100. The seat bench cover system 100 provides a section cover for each section of the back portions: driver-side, passenger-side and center section covers 10, 18, and 26; and each section of the seat portions: driver-side, passenger-side and center section covers 36, 44, and 52.

Each section cover may be made from a stain-proof material forming sectioned sheets dimensioned and adapted to circumscribe each associated section, typically in elongated strips as illustrated in FIG. 5, each cover section typically having longer longitudinal edges relative to its shorter ends. The driver-side and passenger-side section covers may be closed along an outer longitudinal edge for covering that associated end of the bench back 82 or bench seat 84.

A male cover strap 14, 22, 32, 40, 48, and 58, respectively, depends from one end of each section cover, while a complimentary female cover strap 16, 24, 34, 42, 50, and 60, respectively, depends from the opposing end. The female cover strap may end in a buckle 64.

A detachable fastener, such as a zipper, may be provided along an inward longitudinal edge of the driver-side and passenger-side section covers 10, 18 (back portion) and 36, 44 (seat portion): 12, 20 and 38, 46, respectively.

Both longitudinal edges of the center portion section cover sections (back portion and seat portion, 26 and 52) have a first detachable fasteners 30 and 56 with a pull 62 along one edge, and a second detachable fastener 28 or 54 (without the pull).

Each detachable fastener is adapted to removably engage complementary detachable fasteners 68, 72, 76 for edge enclosures 66, 70, 74, 78, 80, which when engaged close off that other open side edge so as to fully enclosure the relative section when the related male and female cover straps are engaged, as illustrated in FIG. 3. Edge enclosures 66, 70, 74, 78, 80 may be mesh material.

A method of using the present invention may include the following. The bench cover system 100 disclosed above may be provided. Complementary detachable fasteners may be engaged to join or separate enclosures and adjacent covers.

In the upright position, the adjacent covers may be engaged through their respective detachable fasteners so that the, say, entire bench back portion is enclosed in the cover system 100. Through disengaging adjacent detachable fasteners of, say, the passenger-side back section and the central back section, and then engaging associated enclosures to the now respective open edges, the passenger-side back section may be moved to the folded condition, as illustrated in FIG. 9, fully enclosed in the same cover system in part because of the engaged enclosure 66, while the remaining sections of the bench back portion 82 may remain in the upright condition, also fully enclosed in the cover system 100.

A kit of the cover system 100 may include components for two or more center sections (back and seat) though not all components need to be used for smaller bench seats, thereby enabling length adjustability.

It should be understood, of course, that the foregoing relates to exemplary embodiments of the invention and that modifications may be made without departing from the spirit and scope of the invention as set forth in the following claims.

What is claimed is:

1. A vehicular bench seat cover system, wherein the vehicular bench seat has a plurality of bench back sections movable between an upright condition and a folded condition relative to a plurality of bench seat sections, the system comprising:
   one or more center bench back sections disposed between adjacent bench back sections;
   a bench back section cover removably covering each bench back section;
   a center back section cover removably covering each center bench back section;
   a detachable fastener along an inner longitudinal edge of each bench back section cover;
   a detachable fastener along both longitudinal edges of each center bench back section cover; and
   an enclosure removably engageable along each longitudinal edge of adjacent back section covers.

2. The vehicular bench seat cover system of claim 1, further comprising:
   one or more center bench seat section disposed between adjacent bench seat sections;
   a bench seat section cover removably for each bench seat section, each bench seat section cover having a detachable fastener along an inner longitudinal edge;
   a center seat section cover removably covering each center bench seat section;
   and a detachable fastener along both longitudinal edges of each center seat section cover; and
   wherein both engageable longitudinal edges has a detachable fastener pull operatively associated thereto.

3. The vehicular bench seat cover system of claim 2, wherein each enclosure is made from mesh material.

4. The vehicular bench seat cover system of claim 2, further comprising two connecting straps, one connecting strap depending from a front portion and another depending from a rear portion, respectively, of each bench back section and each bench seat section, wherein said two connecting straps are configured to removably secure to each other.

* * * * *